United States Patent [19]

Kreis et al.

[11] 3,921,149

[45] Nov. 18, 1975

[54] COMPUTER COMPRISING THREE DATA PROCESSORS

[75] Inventors: Werner Kreis, Bern; Peter Laderach, Munsingen, both of Switzerland

[73] Assignee: Hasler AG, Bern, Switzerland

[22] Filed: Mar. 26, 1974

[21] Appl. No.: 454,854

[30] Foreign Application Priority Data

Mar. 28, 1973 Switzerland ......................... 4379/73

[52] U.S. Cl. ........................ 340/172.5; 235/153 AE

[51] Int. Cl.$^2$ .......................................... G06F 15/16

[58] Field of Search ................ 340/172.5, 146.1 BE; 235/153 AE

[56] References Cited

UNITED STATES PATENTS

| | | | |
|---|---|---|---|
| 3,593,307 | 7/1971 | Gouge, Jr. et al. | 340/172.5 |
| 3,602,900 | 8/1971 | Delaigue et al. | 340/172.5 |
| 3,681,578 | 8/1972 | Stevens | 235/153 AE |
| 3,735,356 | 5/1973 | Yates | 340/172.5 |
| 3,810,119 | 5/1974 | Zieve et al. | 340/172.5 |
| 3,833,798 | 9/1974 | Huber et al. | 235/153 AE |

*Primary Examiner*—Charles E. Atkinson
*Attorney, Agent, or Firm*—Brady, O'Boyle & Gates

[57] ABSTRACT

Circuitry for enabling three processors having no common circuit to operate in parallel in a computer, to be synchronized with one another after the execution of every instruction and after every access to a common memory. The operation of the system is not impaired by a failure in one of the three processors, but the faulty processor is rendered inactive and a failure indication is given.

3 Claims, 5 Drawing Figures

COMPUTER COMPRISING THREE DATA PROCESSORS

BACKGROUND OF THE INVENTION

The invention concerns a computer comprising three data processors which interface with at least one memory.

It is known, that a computer system has a higher reliability when it has more than one processor operating in parallel with each other. This aspect is especially important with computer controlled telecommunication switching systems, which cannot tolerate any breakdown at any time. To obtain the highest reliability three processors operate in parallel. If one of the three processors provides an output which differs from the other two, within the same operation, then this output is most likely in error and the other two identical outputs are probably correct. The majority gate circuit is used for comparing the outputs of the three processors because it provides an output which is the same as that of at least two of the processors.

It is also known that reliability is not significantly lower when the three processors are interfaced with one or more memories as would be the case if each processor was interfaced with its own memory.

In order to maintain the high reliability obtained by the use of three processors it is important not to use any circuits upon which the operations of all three processors are dependent, as would be the case with a master clock or master control system. A fault in the master clock or master control system would render the whole system inoperative.

The three processors must be synchronised with each other in order to obtain a meaningful result from a comparison of their outputs.

OBJECT OF THE INVENTION

It is an object of the invention to indicate a computer system comprising three processors having no common circuits and synchronized to operate with each other.

It is further an object of the invention to provide continuous operation even in the event of a failure of one of the three processors, and to provide in this case an indication of the failure and of the processor which caused the failure.

BRIEF DESCRIPTION OF THE INVENTION

The three data processors of the program controlled computer, simultanously process consecutive instructions of the program. The operations of the three processors are synchronized at the end of the execution of every instruction by a synchronizer, incorporated in each processor. Each synchronizer comprises:

means for generating a first pulse at the end of the execution of every instruction;

a majority gate for receiving the said first pulses from said first pulse generating means and delivering a second pulse on the reception of at least two first pulses;

means for receiving the said second pulse from the corresponding majority gate and starting the execution of the following instruction by its associated processor as soon as said second pulse is received.

A preferred embodiment of the invention will be explained with the aid of the attached figures.

CONTENTS OF THE ATTACHED FIGURES

Figure 1:
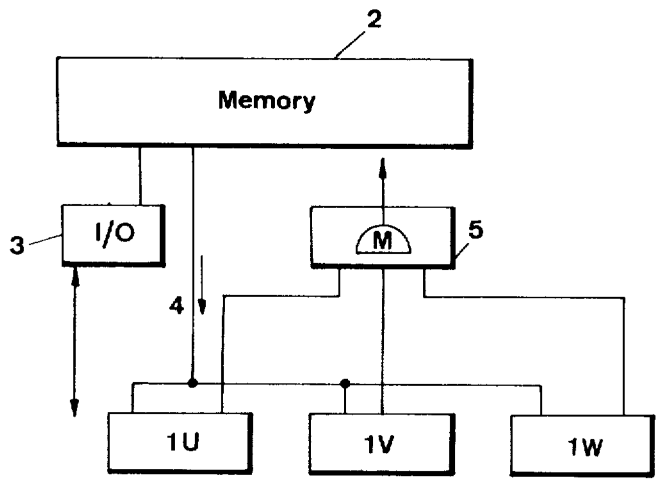

FIG. 1: A block diagram of a data processing system containing three processors and one memory.

Figure 2:
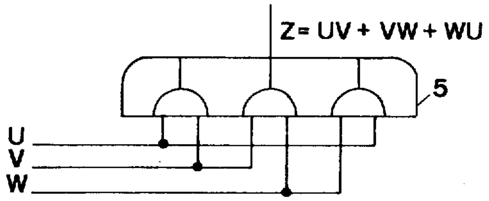

FIG. 2: a schematic diagram of a majority gate.

Figure 3:
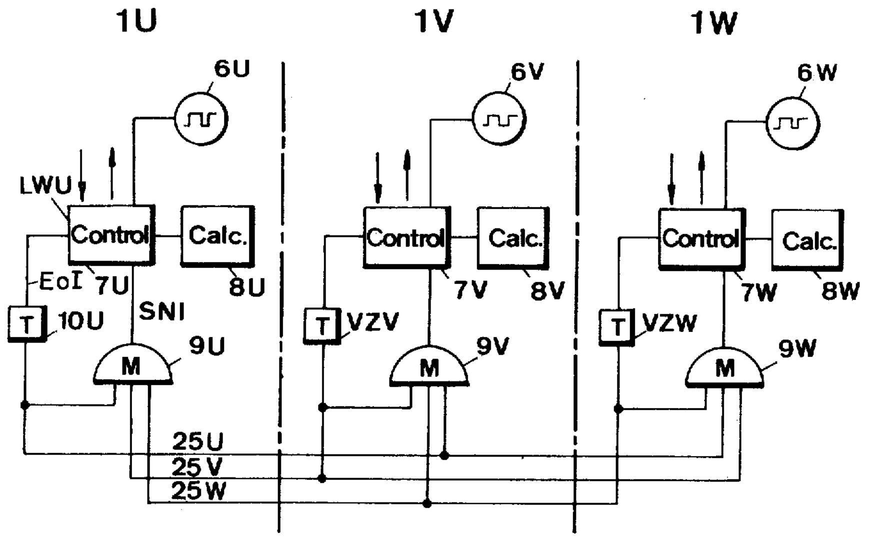

FIG. 3: a schematic block diagram of a synchronizer according to the invention.

Figure 4:
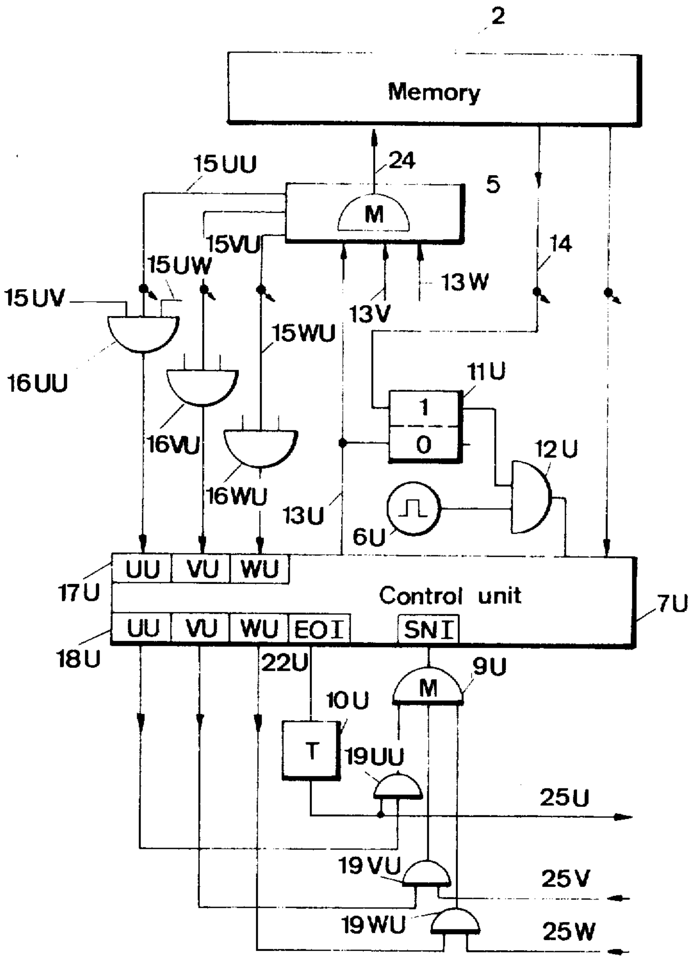

FIG. 4: a schematic block diagram of a further embodiment according to FIG. 3.

Figure 5:
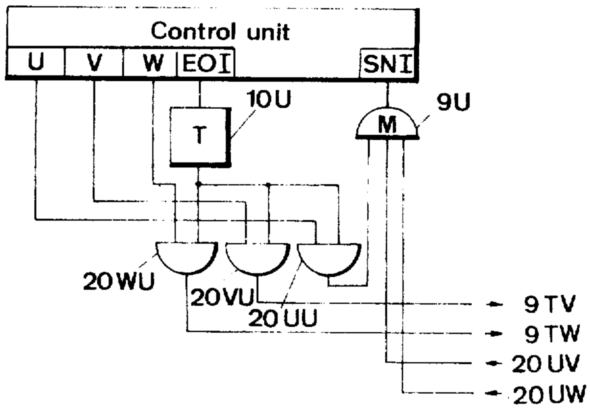

FIG. 5: a schematic block diagram of another implementation of a part of FIG. 4.

DESCRIPTION OF THE INVENTION

FIG. 1 shows the block diagram of a computer comprising three processors 1U, 1V, and 1W, each having a control unit and an arithmetic unit. The three processors interface with a memory 2. The transfer of information between the memory 2 and external devices is routed via the input/output control unit 3. The information from the memory to the processors is transferred directly via lead 4. The correct operation of the memory can be checked by known procedures, e.g. by parity checking. The information from the processors to the memory is routed via the majority circuit 5. It is assumed that the information transfer from the processors to the memory is in the parallel mode and that for each bit of the transferred information a majority gate is provided.

Such a known majority gate is represented in FIG. 2. It consists of three AND-gates and one OR-gate and calculates the Boolean function $Z = UV+VW+WU$. Thus at least two inputs must be in state 1 in order to obtain a 1 at the output.

FIG. 3 shows the means for synchronizing the three processors 1U, 1V, 1W according to the invention, because the three processors are identical the functions controlled by processor 1U will only be described.

The processor incorporates a clock 6U, which controls the control unit 7U and the arithmetic unit 8U. The processor operations proceed in the well known manner: the control unit reads instructions and data out of the memory, while the instructions are executed by the arithmetic unit in several steps, after which the results are written into the memory if necessary. At the end of the execution of every instruction the control unit produces a pulse "End Of Instruction" EOI. This pulse is input to the control unit via a majority gate 9U. The signal output from the majority gate is called "Start New Instruction" SNI and it initiates the execution of the next instruction. SNI is produced only if two EOI pulses are detected; the EOI pulses may not be input simultanously because the clocks work independantly from one another and can differ in frequency and phase. The delays in the processors may also be unequal, so that the same events may not necessarily take place during the same clock intervals. Thus, differences of several clock intervals may be present at the end of the execution of an instruction.

Synchronizing has the effect that such time differences do not accumulate in the course of time but are reduced to at most one clock interval after every instruction.

In order to provide the time for the slowest processor to maintain synchronism with the other two processors, a delay unit 10U is placed between the source of the pulse EOI and the sink of the signal SNI, delaying the EOI pulse for some clock intervals. Thus the slowest processor in executing the current instruction is not involved with initiating the new pulse SNI, but is nevertheless able to terminate the execution of the current instruction and to begin the execution of next instruction simultanously with the other two processors. If the slowest processor cannot start the execution of the next instruction with the other two processors it will fall out of synchronism and will be unable to recover synchronism by itself.

The three processors are not only synchronized at the end of every instruction but also with every access to the memory. This feature is explained with the aid of FIG. 4, which gives a more detailed circuit of processor 1U; the two other processors 1V and 1W are identical. 2 is again the memory, 5 the majority gate and 7U the control unit. 11U is a flip-flop, the output of which is normally a signal 1 which by enabling gate 12, permits the pulses from clock 6 to be input to the control unit 7U. This flip-flop is reset to zero with every access pulse from the control unit to the memory, via lead 13U, and results in inhibiting the clock pulses to the control unit.

Memory access takes place only when at least two of the three processors transmit access pulses to the majority gate 5, via leads 13U, 13V and 13W. The control unit remains at rest until the end of the memory access. At the end of the memory access a response signal on lead 14 sets flip-flop 11U which results in the activation of the control unit by the clock pulses. The operation of the control unit can be interrupted by means other than by the interruption of the clock pulses. Since the signal on lead 14 is transmitted to all three control units simultaneously, the control units perform their task with at most one clock interval difference, allowance being made for certain time differences between the detection of the access pulses.

It is important to detect failures in one of the three processors, even though failures in one processor or its total breakdown have no effect on the operation of the system by reason of the results being obtained with the aid of majority gates. For detecting failures the majority circuit 5, FIG. 4 not only delivers the results of the majority gates (like the gate according to FIG. 2) but also failure signals if the three inputs do not receive the same signal at the end of the delay time. This is done by a simple logic circuit, which e.g. for a signal UVW = 1 1 0 gives a 1 at the majority output and furthermore an error signal at the output 15WU indicating that the signal received on the processor 1W is different from those received from the processors 1U and 1V. Such a logic circuit is provided for each of the leads going from the respective processor to the memory. In the example described failure pulses would also arrive on leads 15UV, and, depending on the failure in processor 1W, also on lead 15UW or not. The failure indications for processor 1U are collected by the OR-gates 16UU, 16 VU, and 16WV, go to the control unit and there are stored for a short time in failure register 17U. From this register they are read out by means of a failure processing program and are processed by the processor. If only rare majority errors occur it is assumed that exterior disturbances have occured not necessitating any special measures. If, however, during a certain time more than a predetermined number of failures occur the first guess is that an error occurred in the contents of one of the registers. Therefore the three control units, again by a majority decision, initiate the run of a program, which has the effect to transfer the contents of the registers of the three processors to the memory and therefrom back to the registers. These transfers going via the majority circuit 5, all register contents now are identical and correspond to the contents of the two registers corresponding with each other. Then the operating program continues at a certain place, so that the three processors continue to operate in synchronism.

If the errors continue to show up in one processor it is declared inactive and put out of operation. This is done if at least two of the processors decide that one processor is disturbed; they set the cells in their configuration output registers 18 U, 18V, 18W attributed to the disturbed processor to zero (see FIG. 4). This happens at least in the configuration output registers of two failureless processors; if it happens also in the processor declared inactive that is of no significance.

The cell of the configuration output register being set to zero gives a 0 instead of a 1 normally delivered. Three AND-gates 19UU, 19VU, 19WU inserted into the leads leading the EOI signals to the majority gate 9U are disabled by the 0 coming from the cell of the configuration output register and thus block the start of the respective processor after the end of an instruction. The majority gates at the input of the two operating processors receive at one input always 0 and act like two-input AND-gates delivering the SNI signal, when the two active processors send their EOI signal.

Instead of arranging the gates 19UU, 19VU, 19WU at the input of the majority gate 9U, the three gates 20UU, 20VU, 20WU can be situated at the output of the delay circuit 10U (FIG. 5), so that forwarding of the signal from the cells U or V or W of the register 18U to the three majority gates is blocked. To this end the output of the gate 20UU is connected with an input of the majority gate 9U, the output of the gate 20VU with an input of the gate 9TV, and the output of the gate 20WU finally with the input of the gate 9TW. Correspondingly the output of the gates 20UV and 20UW are connected to the inputs of the majority gate 9TU; these are the gates corresponding to the gate 20UU in the processors 1V, 1W, which are under control of the cells of their configuration register outputs attributed to 1U.

What we claim is:

1. A computer comprising a memory and three data processors connected to said memory and simultaneously executing identical instructions,
   - each of said processors including
     - a clock,
     - a calculating unit,
     - a control unit connected to receive clock pulses from said clock and connected to control said calculating unit, and
     - synchronizing means connected to said three data processors for synchronizing the respective processor with the two other processors at the end of the execution of each instruction,
   - each synchronizing means including
     - a. pulse generating means having an output delivering a first pulse at the end of the execution of each of said instructions,
     - b. a majority gate having three inputs each connected to the output of said pulse generating means of said control unit of one of said data processors, and having an output delivering a second pulse on the simultaneous receipt of one of said first pulses on at least two of said three inputs of said majority gate, and c. starting means connected to said output of said majority gate and starting the execution of the following instruction on reception of said second pulse.

2. A computer as set forth in claim 1, wherein each of said synchronizing means further includes delay means connected in series with said majority gate between said output of said pulse generating means and said starting means.

3. A computer comprising at least one memory having an access control input, and "end of access" output and a data output, a majority gating means for each memory, each of said majority gating means having three inputs and an output which is connected to said access control input of the respective memory, three data processors, each including a. a control unit having an input and an access request output delivering a memory access request signal on a signal on said control unit input and connected to one of said inputs of said majority gating means, b. synchronizing means connected to said three data processors for synchronizing the respective data processor with the said other two data processors on every one of said access request signals, and including a flip-flop circuit having a set input connected to said "end of access" output of said memory, a reset input connected to said access request output of the respective control unit and a set output connected to said input of said control unit.

* * * * *